(12) United States Patent
Di Marzio et al.

(10) Patent No.: US 12,181,660 B2
(45) Date of Patent: Dec. 31, 2024

(54) ACTIVELY DEFORMABLE METAMIRROR

(71) Applicant: NORTHROP GRUMMAN SYSTEMS CORPORATION, Falls Church, VA (US)

(72) Inventors: Donald Di Marzio, New York, NY (US); Stephane Larouche, Redondo Beach, CA (US); Vesna Radisic, Hermosa Beach, CA (US); Michael R. Hachkowski, Lexington, MA (US); Jeffrey L. Cavaco, Boylston, MA (US); Michael Wojtowicz, Long Beach, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 397 days.

(21) Appl. No.: 17/094,940

(22) Filed: Nov. 11, 2020

(65) Prior Publication Data
US 2022/0146816 A1      May 12, 2022

(51) Int. Cl.
*G02B 26/08*     (2006.01)
*G02B 1/00*      (2006.01)
*G02B 23/06*     (2006.01)

(52) U.S. Cl.
CPC ......... *G02B 26/0858* (2013.01); *G02B 1/002* (2013.01); *G02B 23/06* (2013.01)

(58) Field of Classification Search
CPC ..................... G02B 1/002; G02B 26/0825
See application file for complete search history.

(56) References Cited

U.S. PATENT DOCUMENTS

| | | | | |
|---|---|---|---|---|
| 6,658,208 B2 * | 12/2003 | Watanabe | ............ | G02B 27/646 396/89 |
| 7,474,456 B2 * | 1/2009 | Wang | ........................ | G02F 1/01 359/315 |
| 7,598,652 B2 * | 10/2009 | Kornbluh | .................. | B64C 3/48 310/309 |

(Continued)

FOREIGN PATENT DOCUMENTS

| | | | | |
|---|---|---|---|---|
| CN | 105347295 A | * | 2/2016 | |
| CN | 111189617 A | * | 5/2020 | .......... G01M 11/005 |

(Continued)

OTHER PUBLICATIONS

Zhao, Xiaoguang, et al. "Integrating microsystems with metamaterials towards metadevices." Microsystems & nanoengineering 5.1 (2019): 1-17. (Year: 2019).*

(Continued)

*Primary Examiner* — Christopher Stanford
(74) *Attorney, Agent, or Firm* — John A. Miller; Shumaker, Loop & Kendrick, LLP

(57) ABSTRACT

An optical assembly including a plurality of metamirrors, where each metamirror includes a substrate, a reflective layer formed to the substrate, an array of optical metaelements extending from the reflective layer and an array of micro-actuators coupled to the substrate opposite to the reflective layer. The combination of the micro-actuators are controlled to control the orientation and bending of the metamirrors to set how the metaelements focus a light beam that is reflected off of the reflective layers.

20 Claims, 2 Drawing Sheets

(56) References Cited

U.S. PATENT DOCUMENTS

| | | | |
|---|---|---|---|
| 8,247,060 B2* | 8/2012 | Bratkovski | H05K 9/0075 |
| | | | 428/78 |
| 8,717,659 B2* | 5/2014 | Zheludev | G02B 1/007 |
| | | | 359/291 |
| 9,640,867 B2* | 5/2017 | Behdad | H01Q 21/061 |
| 10,084,239 B2* | 9/2018 | Shaver | H01Q 19/104 |
| 10,259,704 B2* | 4/2019 | Cho | B82B 3/0014 |
| 10,444,492 B2* | 10/2019 | Hopkins | G02B 26/105 |
| 10,481,479 B2* | 11/2019 | Maynard | G06F 3/013 |
| 10,557,924 B1* | 2/2020 | Jang | G01S 7/4817 |
| 10,594,029 B2* | 3/2020 | Liff | H01Q 15/0086 |
| 2005/0128558 A1 | 6/2005 | Ealey | |
| 2006/0050421 A1 | 3/2006 | Ealey | |
| 2009/0206963 A1* | 8/2009 | Nguyen | H03H 9/02417 |
| | | | 334/14 |
| 2019/0257984 A1* | 8/2019 | She | G02B 1/04 |
| 2020/0258598 A1* | 8/2020 | Liu | G16C 60/00 |
| 2021/0080626 A1* | 3/2021 | Radivojevic | H01Q 15/14 |
| 2021/0364808 A1* | 11/2021 | Koshelev | G02B 26/0833 |
| 2022/0179193 A1* | 6/2022 | Bevensee | G02B 26/085 |

FOREIGN PATENT DOCUMENTS

| | | | | |
|---|---|---|---|---|
| CN | 112490671 A | * | 3/2021 | ......... G02B 27/0087 |
| CN | 212712732 U | * | 3/2021 | |
| CN | 113009663 A | * | 6/2021 | |
| WO | 2018058155 A2 | | 3/2018 | |

OTHER PUBLICATIONS

Tapashree Roy, Shuyan Zhang, Il Woong Jung, Mariano Troccoli, Federico Capasso, and Daniel Lopez, "Dynamic metasurface lens based on MEMS technology", APL Photonics 3, 021302 (2018) (Year: 2018).*

F. Capasso, "The future and promise of flat optics: a personal perspective", Nanophotonics 2018; 7(6): 953-957.

N. Yu and F. Capasso, "Flat optics with designer metasurfaces", Nature Materials, vol. 13, Feb. 2014.

S. Shrestha, A.C. Overvig, M. Lu, A. Stein, and N. Yu, "Broadband achromatic dielectric metalenses" Light: Science & Applications (2018) 7:85.

\* cited by examiner

ACTIVELY DEFORMABLE METAMIRROR

BACKGROUND

Field

This disclosure relates generally to an actively deformable metamirror and, more particularly, to an optical assembly having an array of actively deformable metamirrors each including an array of metaelements formed on an array of micro-actuators.

Discussion of the Related Art

Refractive and reflective optical elements have a number of applications in various optical systems for focusing light and other electromagnetic waves. Some of these optical systems often require large apertures to collect enough light for their intended purpose and thus improvements in size and weight of the optical elements is desirable. This is especially true for large aperture ground based mirrors and even more so for air and space based optical systems that are necessary to collect more light. However, the use of conventional refractive optical materials such as glass, as well as materials for large mirrors such as SiC, is limited by weight, size and thickness, and thus it is challenging to provide large apertures using these components.

Metamaterials are artificially crafted composite materials that obtain their properties primarily from their internal microstructure, rather than their chemical composition. Metamaterials can be designed and fabricated as structural units to achieve desired properties and functionalities, such as focusing light with low loss. It is known in the art to specially fabricate transparent metamaterials, such as certain low loss dielectrics, into an array of metastructures or metaelements to form metasurfaces or metalenses to provide ultra-thin flat optics for visible and IR imaging. Metamaterials for these purposes may include dielectric pillars, rings, crosses, etc. on the order of 50-200 nanometers in size periodically arranged on a transparent or reflective substrate, where the optic can be as thin as 10-20 microns. The ability to fabricate optical quality wide-band flat metalenses and metamirrors with good achromatic performance using conventional microelectronic fabrication techniques has been demonstrated in the art.

One of the challenges encountered in the practical application of these metalenses and metamirrors is their size. Typical optical systems for these applications have lenses on the order of 1 mm in diameter and current semiconductor fabrication techniques limit the size to below the cm range. Although good for micro-lens applications such as cell phones, many other applications require significantly larger apertures. One solution is to "tile" many mirrors together to create a segmented large aperture. This is done for some larger reflective telescopes, but the individual segments are still many orders of magnitude larger than typical metalenses. Furthermore, current fabrication techniques limit the phase contrast that can be obtained in the metamirror, thus forcing the use of a Fresnel mirror and/or very small tiles for larger apertures. Therefore, the realization of a large aperture metamirror requires a combination of improvements in the size of each individual tiled mirror, the fabrication of segmented mirrors with a larger number of segments, and the development of computational techniques to correct the optical errors introduced by the Fresnel configuration and segmentation.

Adaptive optics are known in the art for various optical applications that employ miniature actuators, such as piezoelectric actuators, for deforming mirrors. These types of adaptive mirrors have various applications, for example, telescopes having optics that need to be corrected in real time when looking at celestial bodies through changing atmospheric conditions. Such active and adaptive optics systems that provide beam correction using conventional optics and mirror technology, for example, adaptive mirror technology are currently available from AOA Xinetics.

SUMMARY

The following discussion discloses and describes an optical assembly including a plurality of metamirrors, where each metamirror includes a substrate, a reflective layer formed to the substrate, an array of optical metaelements extending from the reflective layer and an array of micro-actuators coupled to the substrate opposite to the reflective layer. The combination of the micro-actuators are controlled to modify the orientation and bending of the metamirrors to set how the metaelements focus a light beam that is reflected off of the reflective layers.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to an actively deformable metamirror is merely exemplary in nature, and is in no way intended to limit the disclosure or its applications or uses.

The present disclosure proposes an optical metamirror including an array of metaelements being formed to a reflective surface and micro-actuators so as to form an adaptive optics having application, for example, in a telescope. Light that impinges on the metamirror is altered by the metaelements, reflected by the reflective surface and again altered by the metaelements to provide light focusing. The micro-actuators are controlled to tilt the metamirror and/or bend the reflective surface so as to control the focusing effect of the metaelements.

Figure 1:
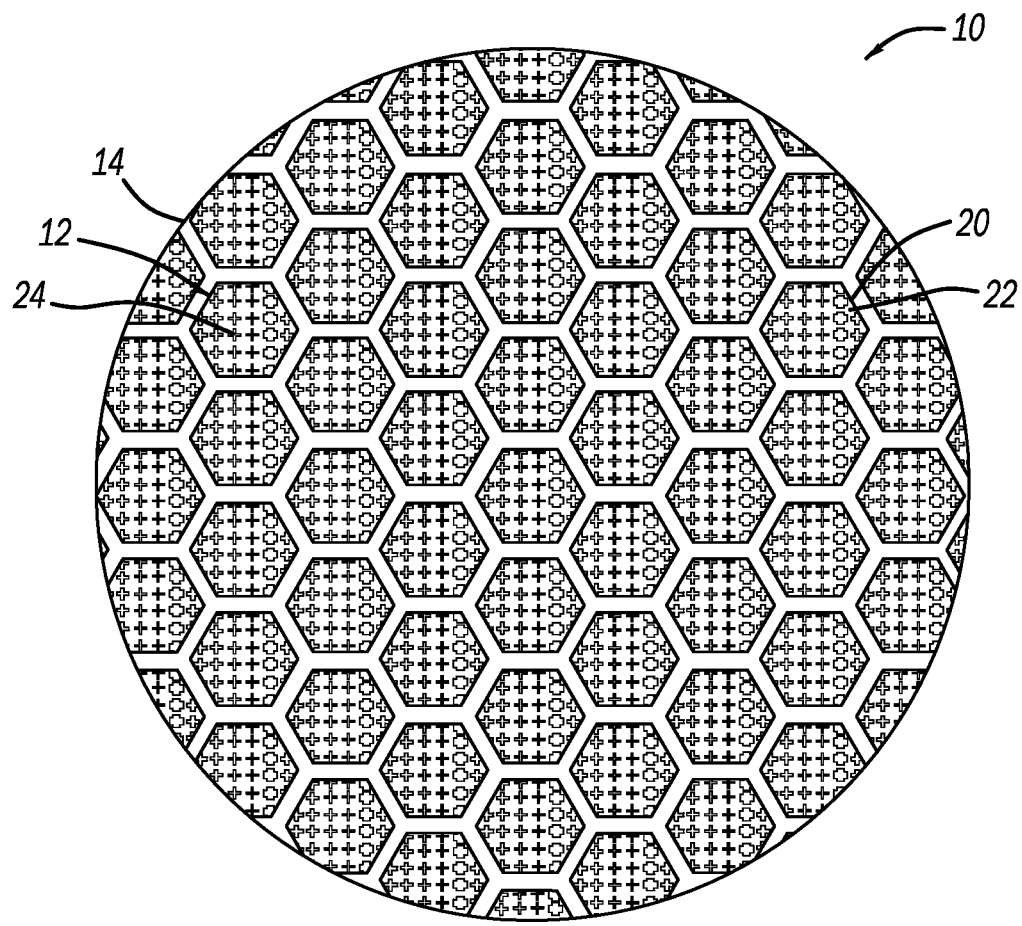
FIG. 1 is a front view of an optical metamirror assembly having a plurality of tiled metamirrors.

FIG. 1 is a front illustration of an optical metamirror assembly 10 for focusing a light beam that includes metamirrors of the type generally referred to above. The assembly 10 includes a plurality of hexagonal-shaped metamirrors 12 arranged in a tiled configuration, where the assembly 10 defines a round aperture 14, such as the aperture of a telescope. It is noted that the size, number and shape of the metamirrors 12 and the shape of the aperture 14 are merely shown as examples and can be generally selected for any suitable application or manufacturing capability. Each metamirror 12 includes a substrate 20 with a reflective surface, such as a metalized reflective layer 22 formed on the substrate 20, and a number of metaelements 24 also formed on the substrate 20 by any suitable process, such as lithography processes used to fabricate semiconductor devices. It is noted that the metaelements 24 are shown much larger than they would be in practice merely for illustrative purposes. It is also noted that in alternate embodiments, for example due to fabrication limitations, each metamirror 12 can include a combination of a number of smaller sub-metamirrors of any suitable shape and size.

The metaelements 24 extend from the substrate 20 to any suitable height, such as 50-200 nm, and have any suitable shape that alters or focusses light at the desired wavelength consistent with the discussion herein, where the assembly is configured to operate over a range of wavelengths. Further, the metaelements 24 can be of different shapes across the metamirror 12. Light that impinges the metamirrors 12 is first altered by the metaelements 24, then reflected by the reflective layer 22 and then altered again by the metaelements 24 to be focused at a focal point. As will be discussed in detail below, each of the metamirrors 12 is actuatable relative to the other metamirrors 12 so that the metamirrors 12 can be tilted relative to each other and the focusing of the light can be controlled.

Figure 2:
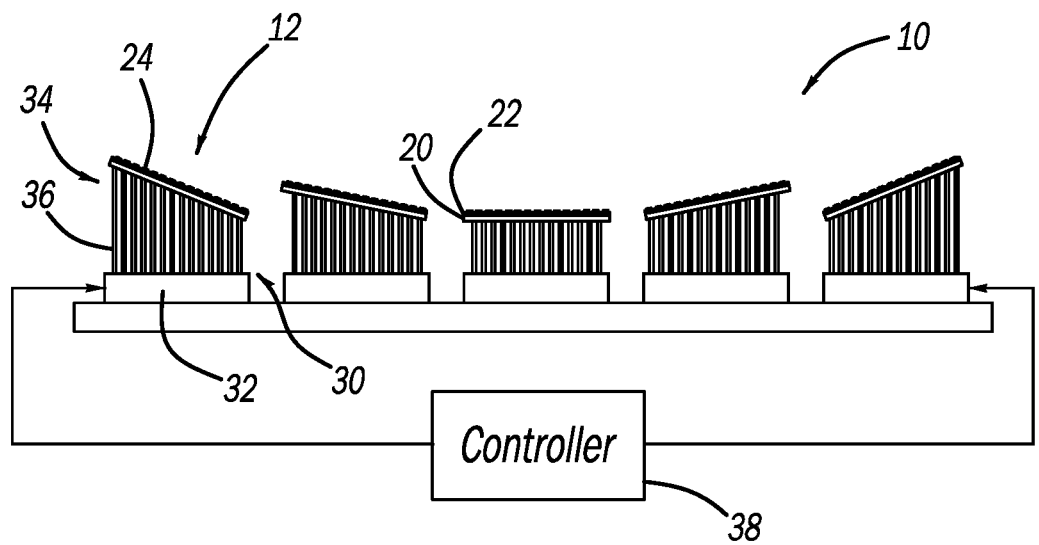
FIG. 2 is a side illustration of the optical metamirror assembly shown in FIG. 1.

FIG. 2 is a side illustration of the assembly 10. Each of the metamirrors 12 includes a micro-actuator assembly 30 having a base portion 32 and a high-density array 34 of micro-actuators 36 extending therefrom whose length can be controllably changed, where an end of the micro-actuators 36 is formed to an opposite side of the substrate 20 from the reflective layer 22. In one non-limiting, the micro-actuators 36 are piezoelectric elements that can be shortened or lengthened by applying an appropriate electrical signal thereto from, for example, a controller 38. Thus, each of the metamirrors 12 can be tilted or bent independently of the other metamirrors 12 to selectively focus the light. Some of the metamirrors 12 can be pre-tilted to bring light reflected from the array 10 into an approximate common focus, where the outer metamirrors 12 may have more tilt, and the micro-actuators 36 are used to bring all of the metamirrors 12 into a common fine focus. In addition to focus control, active and adaptive optics control is used to correct for imperfections and error in the individual metamirrors 12, as well as mitigate the effects from segmentation and chromatic aberrations. An additional advantage of the actuation of the metamirrors 12 includes the ability to adjust optical performance in real time, for example, compensating for environmental, mechanical stresses and atmospheric disturbances. Challenges include the mitigation of chromatic aberration and controlling dispersion from the metamirrors 12.

Figure 3:
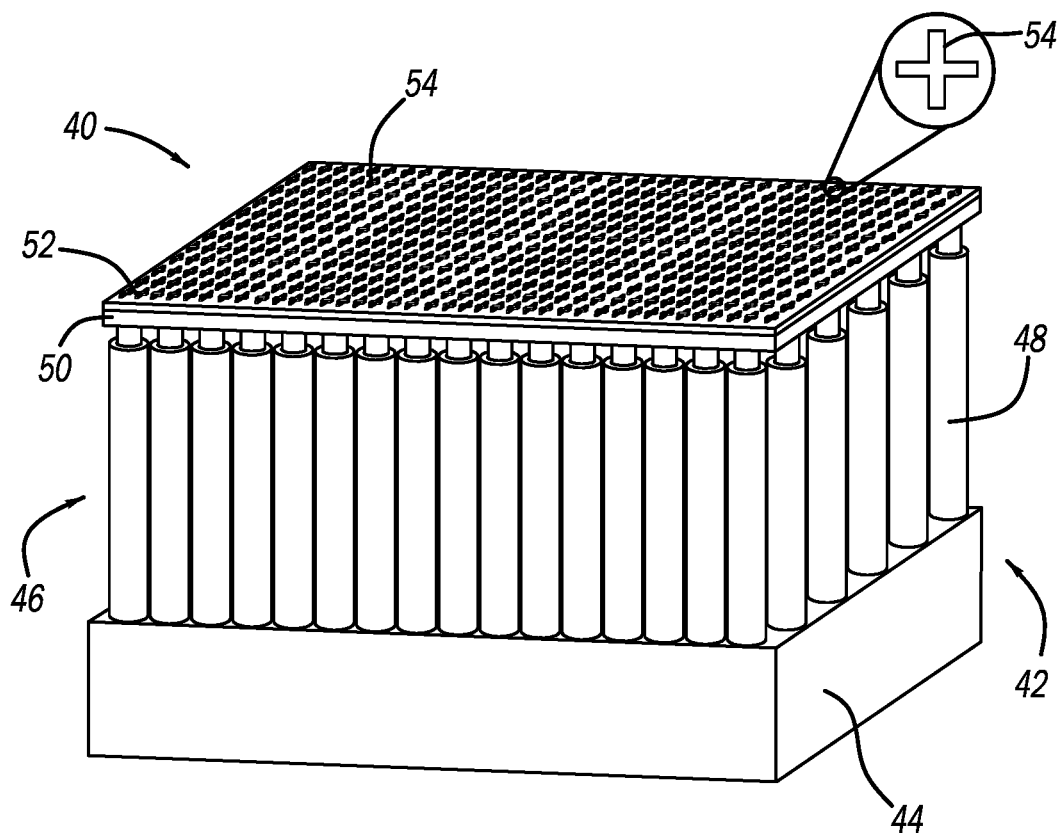
FIG. 3 is an isometric view of a metamirror.

The metamirrors 12 are hexagonal in the embodiment discussed above, but other shapes may be applicable. FIG. 3 is an isometric view of a metamirror 40 similar to the metamirror 12, but having a rectangular shape to illustrate this point. As above, the metamirror 40 includes a micro-actuator assembly 42 having base portion 44 and an array 46 of micro-actuators 48 extending therefrom. A substrate 50 is formed on the micro-actuators 48 and includes a reflective surface 52. An array of metaelements 54 is formed to the substrate 50 and extends therefrom.

Figure 4:
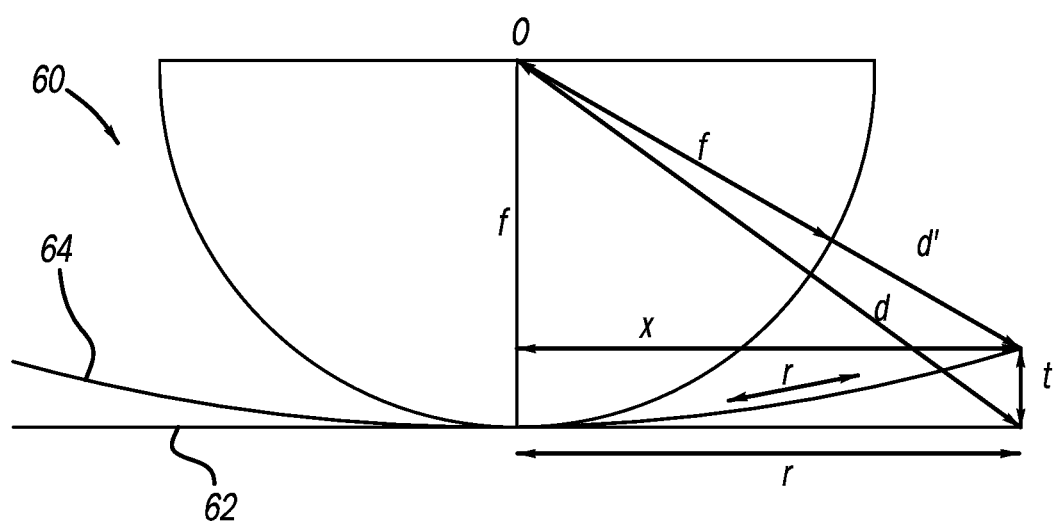
FIG. 4 is an illustration showing the bending geometry of a metamirror relative to a focal length.

There are two effects that are expected from active mirror deformation on optical properties including geometric optics effects and changes in optical dispersion resulting from displacement of metamirror structures. FIG. 4 is an illustration showing the bending geometry of a mirror 60 having a focal length f, where line 62 represents the mirror 60 when it is flat and line 64 represents the mirror 60 when it is curved, and where the metaelements are not shown. Although the discussion below is a two-dimensional description, it will be understood that the mirror 60 is three-dimensional, and is circular in this non-limiting embodiment. The distances d and $d^I$ represent the relative phases, i.e., modulo of the wavelength, imparted by the flat and bent (curved) lines 62 and 64, respectively, of the mirror 60 at position r along the flat and curved lines 62 and 64, where r is assumed to be the same. These are the phase changes that are needed to reflect a downward impinging vertical light ray to a focus at point O. The value t is the displacement of the point on the mirror 60 when it is flat at point r to the equivalent point on the mirror 60 when it is curved. For small displacement (micrometers) this is the same as the small arc shown in this example. It is also assumed that the deformation of the mirror 60 is circular with a radius of curvature R much larger than the diameter D of the mirror 60. In these conditions, the focus f, as a function of the radius $r_m$ of the mirror 60 and the maximum displacement at the edge $t_m$ of the mirror 60, is given as:

$$f(t_m) = 1/2(r_m^2 - dI_0^2)/(dI_0 + t_m) \quad (1)$$

where $dI_0$ is the phase (modulo the light wavelength) needed for focusing the flat, un-deformed mirror 60 at the edge $t_m$ of the mirror 60.

As an example, the case of a 1 cm diameter flat metamirror with a numerical aperture NA=0.2 and a focal length of f=2.4495 cm is analyzed. For a maximum displacement (up) of the edge $t_m$ of the mirror 60 by 10 micrometers, a reduction of the focal length of about 0.5 mm is obtained, which demonstrates a significant degree of focus control through the active optics approach discussed herein, and will greatly facilitate the assembly and focusing of the optical metamirror assembly 10.

Another important advantage of using this active optical correction approach on segmented metamirrors is the ability to relax the condition given by the constraint imposed by the maximum phase change needed for a given diameter metamirror, where the condition is given by:

$$D \times NA \times \Delta\omega < 2c\Delta\Phi, \quad (2)$$

where D is the metamirror diameter, NA is the numerical aperture, $\Delta\omega$ is the bandwidth, c is the speed of light and $\Delta\Phi$ is the phase change.

By employing physical deformations obtainable from actuator arrays, violations of the inequality of equation (2) that occur when using a significantly larger diameter metamirror can be compensated for. From equation (1), the required maximum deformation of the edge $t_m$ of the mirror 60 can be calculated that is necessary to either significantly increase the effective diameter D of the mirror 60 or the bandwidth as needed while keeping the metamirror phase profile fixed as fabricated. For the focusing example given above, if the edge $t_m$ of the mirror 60 is increased to around 230 micrometers, the diameter D of the mirror 60 can be effectively increased by 20%, or approximately span the entire visible spectrum. This can enable the fabrication of metamirrors having a diameter of several centimeter without the use of extremely large phase changes. Such an actively corrected metamirror array can also be combined with computational image correction techniques to improve overall optical performance.

The remaining impact of metamirror deformation on optical performance includes changes expected in metamirror nanostructure spacing and orientation. This involves coupled near-field Mie scattering of light from two or more adjacent dielectric nanostructures that include the mirror 60. These nanostructures, typically rectangular dielectric solids up to 1 um in height, would expect to have their relative spacing and orientations modified by bending of the mirror 60. The distance between the elements will change by an amount close to half the ratio of the mirror thickness to the radius of curvature depending on the elastic modulus of the various materials in the mirror 60. An approximate calculation shows that a 10 µm displacement on a 1 cm metamirror corresponds to a radius of curvature of 3 m. If the thickness of the mirror 60 is 500 µm, which is a typical wafer thickness, the change in spacing is about 0.02%. This has a negligible impact on the performance.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. An optical assembly comprising:
   a plurality of metamirrors each including a substrate, a reflective layer formed to one side of the substrate, where the reflective layer is a separate layer from the substrate, an array of optical metaelements formed to a side of the reflective layer opposite to the substrate and an array of micro-actuators coupled to a side of the substrate opposite to the reflective layer, wherein the metaelements in all of the metamirrors combine to focus a light beam that is reflected off of the reflective layers to a common focal point; and
   a controller for controlling the micro-actuators to bend the reflective layers and control the focusing effect of the metaelements.

2. The optical assembly according to claim 1 wherein each of the metamirrors includes a plurality of sub-metamirrors.

3. The optical assembly according to claim 1 wherein the controller changes the length of the micro-actuators to bend the reflective layer.

4. The optical assembly according to claim 3 wherein the micro-actuators are piezoelectric elements.

5. The optical assembly according to claim 1 wherein at least some of the reflective layers of the metamirrors are pre-tilted relative to each other.

6. The optical assembly according to claim 1 wherein the optical assembly is configured to be part of a telescope.

7. The optical assembly according to claim 1 wherein the plurality of metamirrors are arranged together in a tiled manner.

8. The optical assembly according to claim 7 wherein the metamirrors have a hexagonal shape.

9. The optical assembly according to claim 1 wherein the reflective layer is a metalized layer.

10. An optical assembly comprising a plurality of metamirrors, where each metamirror includes a substrate, a reflective layer formed to the substrate, where the reflective layer is a separate layer from the substrate, an array of optical metaelements extending from the reflective layer and an actuator assembly having an array of micro-actuators coupled to the substrate opposite to the reflective layer, said micro-actuators being controlled to control the orientation and bending of the metamirrors to control how a combination of the metaelements focus a light beam that is reflected off of the reflective layers.

11. The optical assembly according to claim 10 wherein the micro-actuators are piezoelectric elements.

12. The optical assembly according to claim 10 wherein at least some of the substrates of the metamirrors are pre-tilted relative to each other.

13. The optical assembly according to claim 10 wherein the plurality of metamirrors are arranged together in a tiled manner.

14. The optical assembly according to claim 13 wherein the metamirrors have a hexagonal shape.

15. The optical assembly according to claim 10 wherein the optical assembly is configured to be part of a telescope.

16. The optical assembly according to claim 10 wherein the reflective layer is a metalized layer.

17. A metamirror comprising a substrate, a reflective layer formed to one side of the substrate, where the reflective layer is a separate layer from the substrate, an array of optical metaelements formed to a side of the reflective layer opposite to the substrate and an actuator coupled to a side of the substrate opposite to the reflective layer, said metaelements combining to focus a light beam that is reflected off of the reflective layer to a focal point and said actuator being controlled to control the orientation and bending of the metamirror to control how the metaelements focus the light beam.

18. The metamirror according to claim 17 wherein the actuator includes an array of micro-actuators, where the length of the micro-actuators is controlled to bend the reflective layer.

19. The metamirror according to claim 18 wherein the micro-actuators are piezoelectric elements.

20. The metamirror according to claim 17 wherein the reflective layer is a metalized layer.

* * * * *